US012530998B2

(12) United States Patent
Ansari et al.

(10) Patent No.: US 12,530,998 B2
(45) Date of Patent: Jan. 20, 2026

(54) FRAME-LEVEL RESYNCHRONIZATION BETWEEN A DISPLAY PANEL AND A DISPLAY SOURCE DEVICE FOR FULL AND PARTIAL FRAME UPDATES

(71) Applicant: Intel Corporation, Santa Clara, CA (US)

(72) Inventors: Nausheen Ansari, Folsom, CA (US); Seh Kwa, Saratoga, CA (US); Paul S. Diefenbaugh, Portland, OR (US); Robert J. Johnston, Chico, CA (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 18/158,367

(22) Filed: Jan. 23, 2023

(65) Prior Publication Data

US 2023/0162640 A1 May 25, 2023

Related U.S. Application Data

(63) Continuation of application No. 17/133,275, filed on Dec. 23, 2020, now Pat. No. 11,562,674, which is a continuation of application No. 16/147,383, filed on Sep. 28, 2018, now Pat. No. 10,891,887.

(51) Int. Cl.
*G09G 3/20* (2006.01)

(52) U.S. Cl.
CPC ........... *G09G 3/20* (2013.01); *G09G 2310/04* (2013.01); *G09G 2310/08* (2013.01); *G09G 2320/0261* (2013.01); *G09G 2330/021* (2013.01); *G09G 2340/0435* (2013.01)

(58) Field of Classification Search
CPC .. G09G 3/20; G09G 2310/04; G09G 2310/08; G09G 2320/0261; G09G 2330/021; G09G 2340/0435
See application file for complete search history.

(56) References Cited

U.S. PATENT DOCUMENTS

| | | | | |
|---|---|---|---|---|
| 4,450,442 | A | 5/1984 | Tanaka | |
| 8,823,721 | B2 | 9/2014 | Vasquez et al. | |
| 9,052,902 | B2 | 6/2015 | Hayek et al. | |
| 9,558,721 | B2 * | 1/2017 | Sakariya .................. | G09G 3/20 |
| 10,891,887 | B2 | 1/2021 | Ansari et al. | |

(Continued)

OTHER PUBLICATIONS

United States Patent and Trademark Office, "Non-final Office Action," mailed in connection with U.S. Appl. No. 16/147,383, on Feb. 13, 2020, 13 pages.

(Continued)

*Primary Examiner* — David D Davis
(74) *Attorney, Agent, or Firm* — Alliance IP, LLC

(57) ABSTRACT

Technology for a display source device is described. The display source device can receive a frame start indication from a display panel at a start of a frame. The display source device can align a timing of the display source device to a timing of the display panel based on the frame start indication received from the display panel to obtain frame-level synchronization between the display source device and the display panel. The display source device can send one or more frame update regions to the display panel in accordance with the timing of the display source device that is aligned to the timing of the display panel.

20 Claims, 8 Drawing Sheets

(56) References Cited

U.S. PATENT DOCUMENTS

| | | | | |
|---|---|---|---|---|
| 2004/0189570 | A1 | 9/2004 | Selwan | |
| 2008/0036748 | A1 | 2/2008 | Lees | |
| 2011/0157198 | A1 | 6/2011 | Vasquez et al. | |
| 2011/0157202 | A1* | 6/2011 | Kwa | G09G 5/395 345/545 |
| 2012/0133659 | A1 | 5/2012 | Masnikosa et al. | |
| 2014/0104243 | A1 | 4/2014 | Sakariya et al. | |
| 2014/0184629 | A1* | 7/2014 | Wyatt | G09G 5/395 345/547 |
| 2014/0218378 | A1* | 8/2014 | Roh | G06T 1/60 345/519 |
| 2015/0379665 | A1* | 12/2015 | Kwa | G09G 5/00 345/522 |
| 2017/0109859 | A1 | 4/2017 | Singh et al. | |
| 2017/0124981 | A1* | 5/2017 | Lee | G09G 5/003 |
| 2018/0204502 | A1 | 7/2018 | Sung et al. | |
| 2019/0043406 | A1 | 2/2019 | Ansari et al. | |
| 2019/0051269 | A1* | 2/2019 | Kwa | G09G 5/12 |
| 2023/0162640 | A1* | 5/2023 | Ansari | G09G 3/20 345/213 |

OTHER PUBLICATIONS

United States Patent and Trademark Office, “Notice of Allowance,” mailed in connection with U.S. Appl. No. 16/147,383, on Aug. 21, 2020, 9 pages.

* cited by examiner

FRAME-LEVEL RESYNCHRONIZATION BETWEEN A DISPLAY PANEL AND A DISPLAY SOURCE DEVICE FOR FULL AND PARTIAL FRAME UPDATES

CROSS-REFERENCE TO RELATED APPLICATIONS

This application is a continuation of (and claims the benefit of priority under 35 U.S.C. § 120) U.S. application Ser. No. 17/133,275, filed Dec. 23, 2020, and entitled FRAME-LEVEL RESYNCHRONIZATION BETWEEN A DISPLAY PANEL AND A DISPLAY SOURCE DEVICE FOR FULL AND PARTIAL FRAME UPDATES, which is a continuation of U.S. application Ser. No. 16/147,383, filed Sep. 28, 2018, now issued U.S. Pat. No. 10,891,887, and entitled FRAME-LEVEL RESYNCHRONIZATION BETWEEN A DISPLAY PANEL AND A DISPLAY SOURCE DEVICE FOR FULL AND PARTIAL FRAME UPDATES. The disclosures of the prior applications are considered part of and hereby incorporated by reference in their entirety in the disclosure of this application.

BACKGROUND

Display interfaces can allow audio/video to be transmitted from a source device to a display device. Common types of display interfaces include, but are not limited to, High-Definition Multimedia Interface (HDMI), DisplayPort (DP), embedded DisplayPort (eDP), or Mobile Industry Processor Interface (MIPI) display serial interface (DSI). HDMI is a proprietary audio/video interface for transmitting uncompressed video data and compressed/uncompressed digital audio data from an HDMI-compliant source device, such as a display controller, to a compatible computer monitor, video projector, digital television or digital audio device. HDMI is a digital replacement for analog video standards. DisplayPort is a digital display interface that is standardized by the Video Electronics Standards Association (VESA). DisplayPort is an interface that is used to connect a video source to a display device, such as a computer monitor, and can carry audio and other forms of data. DisplayPort was designed to replace Video Graphics Array (VGA) and Digital Visual Interface (DVI). The DisplayPort interface is backward compatible with other interfaces, such as HDMI and DVI. eDP defines a standardized display panel interface for internal connections, e.g., graphics cards to notebook display panels. The MIPI DSI defines a high-speed serial interface between a host processor and a display module. The MIPI DSI enables manufacturers to integrate displays to achieve high performance and improved imagery and video scenes. The MIPI DSI is commonly used for displays in smartphones, tablets, laptops and vehicles.

BRIEF DESCRIPTION OF THE DRAWINGS

Features and advantages of technology embodiments will be apparent from the detailed description which follows, taken in conjunction with the accompanying drawings, which together illustrate, by way of example, various technology features; and, wherein.

Figure 1A:
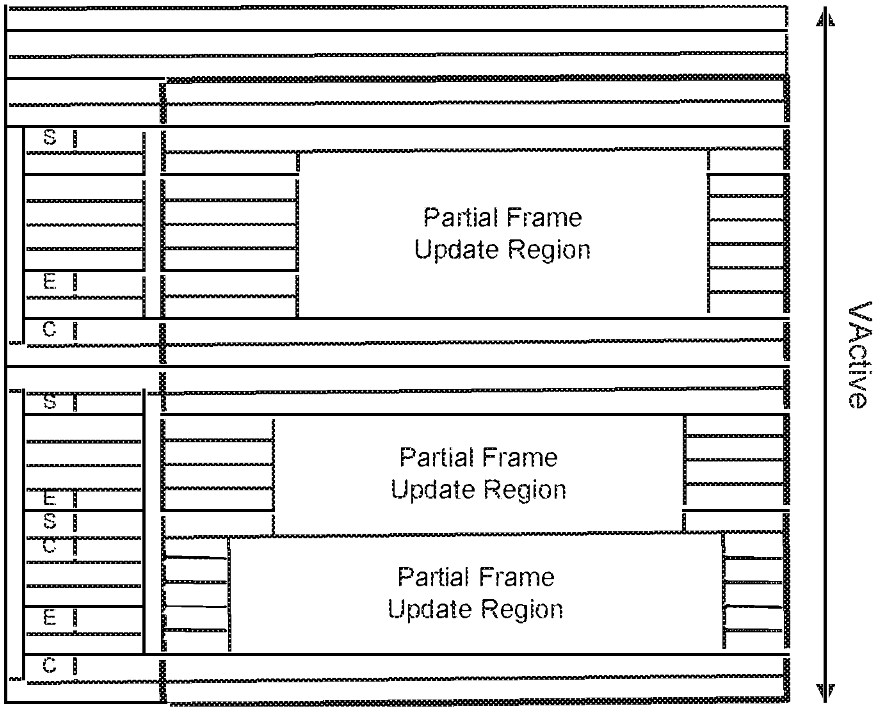
FIGS. 1A and 1B illustrate sending a plurality of partial frame update regions from a display source device to a display panel in accordance with an example embodiment.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various technology embodiments. One skilled in the relevant art will recognize, however, that such detailed embodiments do not limit the overall technological concepts articulated herein, but are merely representative thereof.

As used in this written description, the singular forms "a," "an" and "the" include express support for plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one technology embodiment. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various technology embodiments and examples can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of technological embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "maximized," "minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

In one example, DP/eDP display panels have traditionally had two modes of operation—Panel Self Refresh (PSR or PSR2) mode or non-PSR mode. In the PSR/PSR2 mode, PSR/PSR2 can be enabled. In the non-PSR mode, PSR/PSR2 can be disabled. In the PSR/PSR2 mode, the display panel can be refreshed from a frame buffer (or remote frame buffer) in the display panel (or display sink). For example, in the PSR/PSR2 mode, the display panel can send frame data to the frame buffer, and the display panel can read the frame data from the frame buffer. The frame data can be a full frame update or a partial (or selective) frame update. In the non-PSR mode, the display panel can be refreshed directly with frame data received from a display source device (or content source). In the non-PSR mode, the display panel can receive frame data directly from the display source device, rather than reading the frame data from the frame buffer (as in the PSR/PSR2 mode). In the non-PSR mode, the display panel can write the frame data received from the display source device to the frame buffer. When switching between the PSR/PSR2 mode and the non-PSR mode, the display source device and the display panel can resynchronize over several frames, which can cause significant overhead. When the display panel is in the PSR/PSR2 mode, a first issue can involve power penalties resulting from writing frame data to the frame buffer and reading frame data from the frame buffer.

Further, the PSR2 mode can necessitate that a selective update region be sent to the display panel at precisely a time the selective update region is to be rendered on a screen of the display panel. A second issue can involve a power penalty resulting from keeping the display source device awake and powered on for a significant portion of a frame time to allow the selective update region to be sent to the display panel at the time the selective update region is to be rendered on the screen of the display panel.

As described in further detail below, the present technology provides a mechanism which can be used to address the first issue and the second issue relating to the power penalties, such that the mechanism can allow both the display source device and the display panel to achieve improved power efficiency when the display panel operates in the PSR/PSR2 mode.

More specifically, the present technology provides a power efficient mechanism for fast frame-level resynchronization of a timing of the display source device and a timing of the display panel when the display panel operates in the PSR/PSR2 mode. With the fast frame-level resynchronization, the display source device can align its timing to the timing of the display panel based on a frame start indicator that is communicated from the display panel to the display source device at a start of a frame. The fast frame-level resynchronization enables the display source device to send selective update region(s) as a burst to the display panel, before the selective update region(s) are to be displayed on the screen of the display panel, thereby allowing the display source device to enter a low power mode (or low power state) for extended periods of time. Without fast frame-level resynchronization, as in previous solutions, the display source device would send the selective update region(s) at a stream clock rate and at the time the selective update region(s) were to be rendered on the screen of the display panel when the display source device and the display panel were out of sync, so the selective update region(s) were not sent as a burst to the display panel. With the fast frame-level resynchronization mechanism, as described herein, the display source device and the display panel can maintain timing synchronization and the display source data can send data aligned to display panel timings, which can enable the display source device to send multiple selective update regions as a burst at the start of a frame.

In addition, the mechanism provides a hybrid PSR mode in which the display panel continues to operate in the PSR/PSR2 mode and display live frame data as the frame data is being received as full frame updates from the display source device. In the hybrid PSR mode, the display panel can receive the full frame updates directly from the display source device. In addition, in the hybrid PSR mode, the display source device can provide indications to the display panel that enable the display panel to bypass or avoid reading and/or writing the frame data corresponding to the full frame updates from/to the frame buffer. As a result, the display source device and the display panel can be more power efficient when the display panel operates in the PSR/PSR2 mode.

In previous solutions, there was no mechanism to allow the display panel to switch between displaying frame data received directly from the display source device and frame data read from the frame buffer. In previous solutions, the display panel would always read frame data from the frame buffer when operating in the PSR/PSR2 mode. Further, in previous solutions, selective update region(s) would be sent to the display panel when needed by the display panel (as the selective update region(s) would be sent at the time they were to be rendered on the screen of the display panel).

In the present technology, the capabilities of the PSR/PSR2 mode can be enhanced by providing a resynchronization mechanism between the display source device and the display panel. After the display source device and the display panel are in synchronization, the frame buffer can be bypassed in certain situations and selective update regions can be asynchronously transmitted at an earlier time to enable significant power reduction at the display source device and/or the display panel.

In previous solutions, when the display panel operates in the PSR/PSR2 mode, for the display panel and the display source device to remain in synchronization with each other, the display source device would stay powered on and would continue to drive display panel timings. In other words, the display source device would be the master of time and send its timing to the display panel, and the timing of the display panel would be slaved to the timing of the display source device. In previous solutions, the display source device would drive the display panel timings, even when the display panel operated in the PSR/PSR2 mode, which prevented the display source device from entering a low power state. Furthermore, in previous solutions, when the display source device and the display panel were not synchronized during the PSR2 mode and the display source device wanted to send a partial (or selective) frame update to the display panel, the display source device would send partial frame update regions at a stream clock rate at a time the partial frame update regions were to rendered on a screen of the display panel. In previous solutions, when the partial frame update regions were not sent at the stream clock rate at the same time as rendering, all of the partial updates may not have been applied together to a single frame and caused tearing.

In the present technology, rather than the display source device driving the timing of the display panel, a frame-level synchronization mechanism can be implemented, in which the display panel can communicate a frame start indicator at a start of a frame to the display source device when the display panel operates in the PSR/PSR2 mode, and the display source device can align its timings using the frame start indicator received from the display panel. In other words, rather than the display panel aligning its timings to that of the display source device, the display source device can align its timings to that of the display panel using the frame start indicator. The frame start indicator can be sent from the display panel to the display source device periodically, e.g., at a start of each frame. The frame start indicator can be sent via a wire connecting the display panel and the display source device. Furthermore, the frame-level resynchronization (i.e., maintain time synchronization) between the display source device and the display panel in the PSR/PSR2 mode can enable the display source device (that is aligned with the display panel timings) to send frame data to the display panel. The display source device can send multiple partial frame update regions asynchronously to the display panel after a start of a frame. In other words, the display source device can transmit all of the partial frame update regions in raster order back-to-back to the display panel. After the multiple partial frame update regions are transmitted to the display panel, the display source device can turn a link between the display source device and the display panel off, and the display source device can power itself down for a remaining duration of the frame. As a result, the ability to perform the frame-level synchronization between the display source device and the display panel can enable the display source device to enter a low power mode (or power down completely) for an extended period of time when the display panel operates in the PSR/PSR2 mode.

Figure 1B:
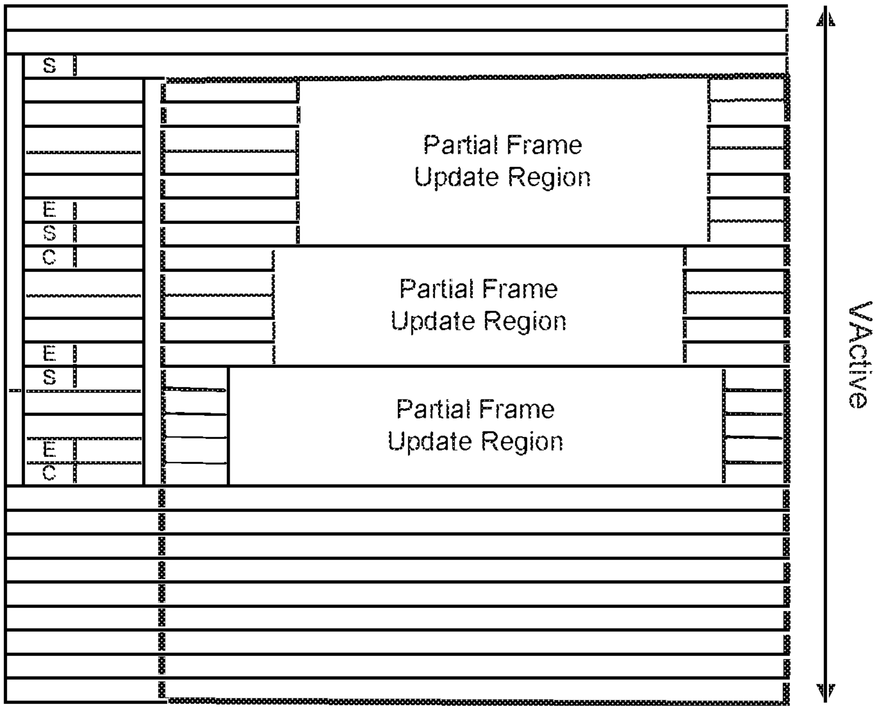

FIGS. 1A and 1B illustrate examples of sending a plurality of partial frame update regions from a display source device to a display panel. In FIG. 1A, the plurality of partial frame update regions can be sent at a stream clock rate and at a time the partial frame update regions are to be rendered on a screen of the display panel. Each partial frame update region can be associated with a start (S) of the partial frame update region, an end (E) of the partial frame update region and a cyclic redundancy check (C) for the partial frame update region. The cyclic redundancy check can be sent to ensure that there is no corruption in the partial frame update region. In this example, the display source device has to remain awake to send the plurality of partial frame update regions. In FIG. 1B, when frame-level synchronization is enabled between the display source device and the display panel, the plurality of partial frame update regions can be transmitted asynchronously from the display source device to the display panel after a start of a frame. The plurality of partial frame update regions can be transmitted in raster order back-to-back to the display panel. After the plurality of partial frame update regions are transmitted to the display panel, the display source device can turn a link between the display source device and the display panel off, and the display source device can power itself down for a remaining duration of the frame.

As shown in FIGS. 1A and 1B, a number of total lines can be the same, and the pair of short lines in FIG. 1A can be similar to the pair of long lines in FIG. 1B, with a difference being that by transmitting the plurality of partial frame update regions as a burst, the display source device can power down 10 lines up from a bottom (as shown in FIG. 1 B), as compared to the display source device powering down 1 line up from a bottom (as shown in FIG. 1A).

In one example, when the display source device is in a low power mode after transmitting the burst of partial frame update regions, the display source device can awake and transition to a normal power mode upon receiving another frame start indication from the display panel (e.g., at the start of the next frame). After the display source device wakes up, the display source device can send new frame data to the display panel (assuming that the display source device has new frame data to send). Alternatively, the display source device can maintain a local timer that wakes up the display source device at a specific time (rather than the display source device being awaken from the frame start indication).

In previous solutions, the prior PSR/PSR2 implementation would necessitate the display source device to always write frame data into the frame buffer, and the display panel would read the frame data from the frame buffer. In the prior PSR/PSR2 implementation, the display source device would not directly send frame data to the display panel while bypassing the frame buffer. As a result, the prior PSR/PSR2 implementation resulted in increased power consumption and additional time involved in writing the frame data into the frame buffer and reading the frame data from the frame buffer.

In the present technology, with the frame-level resynchronization, the display source device and the display panel can maintain frame synchronization to enable a hybrid PSR mode of operation. In the hybrid PSR mode, when the display source device is to send frame data corresponding to a full frame update region to the display panel, the display source device can indicate to the display panel to bypass reading the full frame update region from the frame buffer. However, the display source device can indicate that the display panel is to still write the full frame update region to the frame buffer. In other words, based on the indication received from the display source device, the display panel can consume the frame data received directly from the display source device for rendering at the display panel instead of consuming the frame data from the frame buffer, thereby saving power and reducing an amount of time involved for consuming the frame data for rendering at the display panel. The display panel can directly display the frame data as the display source device is sending the frame data, since the display panel and the display source device are in synchronization. This indication from the display source device can reduce an amount of overhead at the display panel, as the display panel can avoid performing an additional read operation (i.e., the display panel avoids reading the full frame update region from the frame buffer). In addition, since the display source device directly sends the full frame update region to the display panel, the display source device avoids writing the full frame update region into the frame buffer.

Moreover, in the present technology, in one example, the display source device can be aware that a next frame also corresponds to a full frame update region (i.e., a current frame will be completely refreshed by the next frame). In this example, the display source device can indicate to the display panel to bypass both reading the full frame update region from the frame buffer and writing the full frame update region to the frame buffer. This indication from the display panel can reduce an amount of overhead at the display panel, as the display panel can avoid reading/writing the full frame update region from/to the frame buffer. In addition, the display source device can avoid writing the full frame update region into the frame buffer, and can directly send the full frame update region to the display panel.

In one example, writing the full frame update region(s) into the frame buffer and reading the full frame update region(s) from the frame buffer can cause spikes in power usage for the display source device and the display panel. By sending the indication from the display source device to the display panel, a reduced number of read/write operations can be performed, thereby reducing power consumption at the display source device and the display panel.

Figure 2:
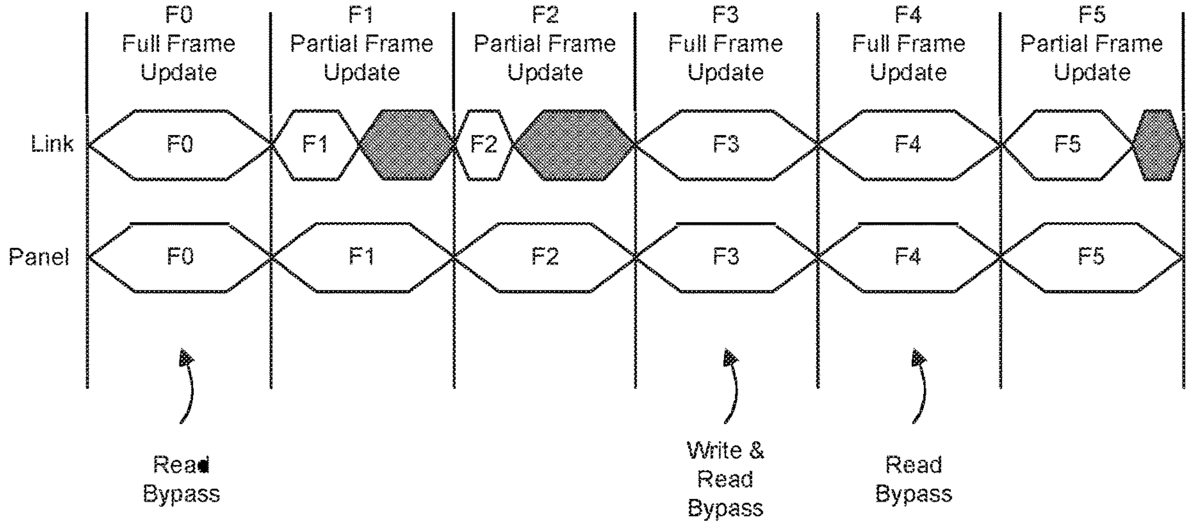
FIG. 2 illustrates sending full frame update regions from a display source device to a display panel with a read and/or write bypass with respect to a frame buffer in accordance with an example embodiment.

FIG. 2 illustrates an example of sending full frame update regions from a display source device to a display panel with a read and/or write bypass with respect to a frame buffer. In Frame 0 (F0), the display source device can send a full frame update region over a link to the display panel. Along with the full frame update region for F0, the display source device can send an indication that the frame update for F0 is a full frame update region (and optionally an indication that there will be partial frame updates to follow), and the indication may be sent to indicate that the display panel is to bypass reading the full frame update region for F0 from the frame buffer (but not bypass writing the full frame update region for F0 to the frame buffer). In other words, the display source device can directly send the full frame update region for F0 to the display panel while bypassing the frame buffer, and then the display panel can write the full frame update region for F0 to the frame buffer (full frame update region for F0 will be used in subsequent frames). In addition, when the display source device sends the indication that there will be partial frame updates to follow, the display panel can write the full frame update region for F0 to the frame buffer, such that the full frame update region for F0 can be used by the partial frame updates to follow.

In Frame 1 (F1) and Frame 2 (F2), the display source device can send partial frame update regions over the link to the display panel for F1 and F2, respectively. In these cases, parts of F1 and F2 can be retained, and new frame data corresponding to the partial frame update regions can be merged with earlier frame data (full frame update region F0 stored in the frame buffer) and read/write operations will occur with respect to the frame buffer. In Frame 3 (F3), the display source device can send a full frame update region for F3 over the link to the display panel. The display source device can include an indication that the full frame update region for F3 is to be followed by additional full frame update region(s). Thus, the display source device can indicate that the display panel can avoid both reading the full frame update region for F3 from the frame buffer and writing the full frame update region for F3 to the frame buffer. In Frame 4 (F4), the display source device can send a full frame update region for F4 over the link to the display panel. The display source device can include an indication that the display panel is to write the full frame update region for F4 to the frame buffer but bypass reading the full frame update region for F4 from the frame buffer. For these back-to-back full frame updates in F3 and F4, the display panel can avoid reading from the frame buffer, which is possible when the display panel is in synchronization with the display source device. In Frame 5 (F5), the display source device can send a partial frame update region over the link to the display panel for F5.

In previous solutions, in the prior PSR/PSR2 implementation, the display source device and the display panel would become out of sync (i.e., would become unsynchronized) when there was no frame update region from the display source device, and at this time, the display source device would power down completely. However, in previous solutions, a drift would occur between the display source device and the display panel and when the display source device would awaken, it would take multiple frames for the display source device and the display panel to resynchronize and for the PSR/PSR2 mode to be re-enabled. For example, a resynchronization time would be 8 to 16 frames, depending on the type of display panel. In previous solutions, during this period when the display source device and the display panel were in the process of resynchronization, only full frame updates could occur and selective updates would be disabled.

In the present technology, with the frame-level resynchronization, when the display source device awakens, the display source device can realign its timings with the timings of the display panel based on a frame start indication received from the display panel at a start of a frame. The frame start indication can provide a reference of time for the display source device, which enables the timings of the display source device to be aligned with the timings of the display panel. The frame start indication can enable the display source device to realign its timings with the timings of the display panel in a reduced period of time. As a result, selective updates can be enabled in the reduced period of time after the resynchronization occurs between the display panel and the display source device.

Figure 3:
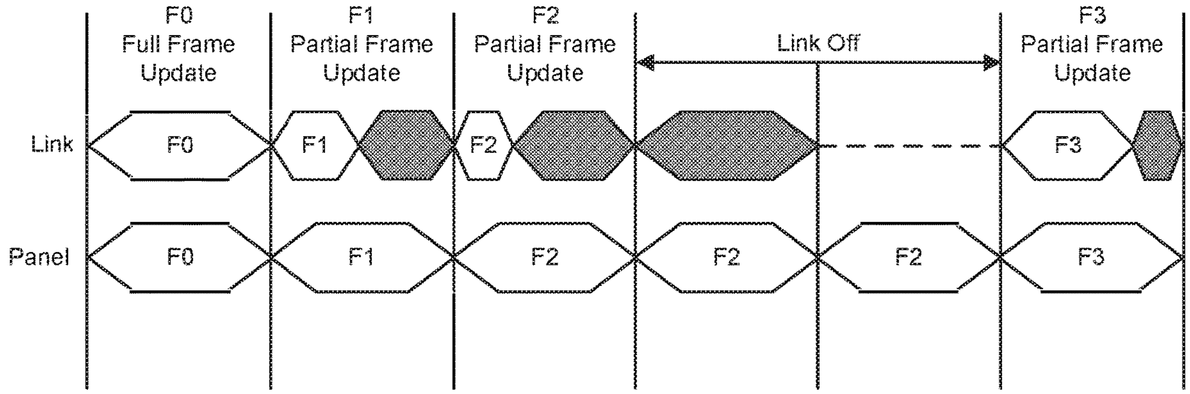
FIG. 3 illustrates waking up a display source device from a low power mode and realigning a timing of the display source device to a timing of a display panel in accordance with an example embodiment.

FIG. 3 illustrates an example of waking up a display source device from a low power mode and realigning a timing of the display source device to a timing of a display panel. In Frame 0 (F0), the display source device can send a full frame update region over a link to the display panel. In Frame 1 (F1) and Frame 2 (F2), the display source device can send partial frame update regions over the link to the display panel for F1 and F2, respectively. After F2, there can be no frame update, so the link can be turned off and the display source device can enter the low power mode. The display panel can continue displaying F2. In this example, the display panel can continue displaying the frame associated with F2 for two additional frames. At this point, the display source device can awaken from the low power mode and enter a normal power mode. Based on the frame-level synchronization mechanism described earlier, the display source device can receive a frame start indication from the display panel, and the display source device can resynchronize with the display panel using the frame start indication. In other words, the frame-level synchronization mechanism can enable the display source device to realign its timings with the timings of the display panel in a reduced amount of time. After the display source device awakens from the low power mode and resynchronization is complete, in Frame 3 (F3), the display source device can send a partial frame update region for F3 over the link to the display panel. As a result, partial frame (or selective) updates can be enabled immediately after the display source device awakens from the low power mode.

In one configuration, a display source device can receive a frame start indication from a display panel at a start of a frame. The display panel can send the frame start indication at the start of the frame. The display panel can send the frame start indication when the display panel enters a PSR/PSR2 mode. The display source device can align a timing of the display source device to a timing of the display panel based on the frame start indication received from the display panel to obtain frame-level synchronization between the display source device and the display panel. The display source device can send one or more frame update regions to the display panel in accordance with the timing of the display source device that is aligned to the timing of the display panel.

In one example, the display source device can send a plurality of partial frame update regions to the display panel as a burst in accordance with the timing of the display source device that is aligned with the timing of the display panel. The display source device can enter a low power mode at the display source device after the plurality of partial frame update regions are sent to the display panel. The display source device can send the plurality of partial frame update regions asynchronously after the start of the frame in raster order, and then enter the low power mode for a remaining duration of the frame. The plurality of partial frame update regions can be sent prior to display of the partial frame update regions at the display panel. In addition, each partial frame update region in the plurality of partial frame update regions can be associated with a start of the partial frame update region and an end of the partial frame update region.

In one example, the display source device can receive a second frame start indication from the display panel at a start of a second frame when the display source device is in the low power mode. The display source device can transition from the low power mode to a normal power mode after the second frame start indication is received from the display panel. The display source device can realign the timing of the display source device to the timing of the display panel based on the second frame start indication received from the display panel. The display source device can send new frame data (e.g., new frame data for the second frame) to the display panel after entering the normal power mode when the display source device includes new frame data to send to the display panel.

In one example, the display source can send a full frame update region directly from the display source device to the display panel while avoiding a frame buffer. The full frame update region can be sent with an indication that instructs the display panel to bypass reading the full frame update region from the frame buffer. The display panel can receive the full frame update region directly from the display source device while bypassing the frame buffer. The display panel can write the full frame update region to the frame buffer. The display panel can display the full frame update region as received from the display source device.

In one example, the display source can send a full frame update region directly from the display source device to the display panel while avoiding a frame buffer. The full frame update region can be sent with an indication that the full frame update region is to be immediately followed by another full frame update region, and the indication can instruct the display panel to bypass reading the full frame update region frame the frame buffer and writing the full frame update region to the frame buffer. The display panel can receive the full frame update region directly from the display source device while bypassing the frame buffer. The display panel can avoid writing the full frame update region to the frame buffer based on the indication received from the display source device. The display panel can avoid reading the full frame update region from the frame buffer based on the indication received from the display source device. The display panel can display the full frame update region as received from the display source device.

Figure 4:
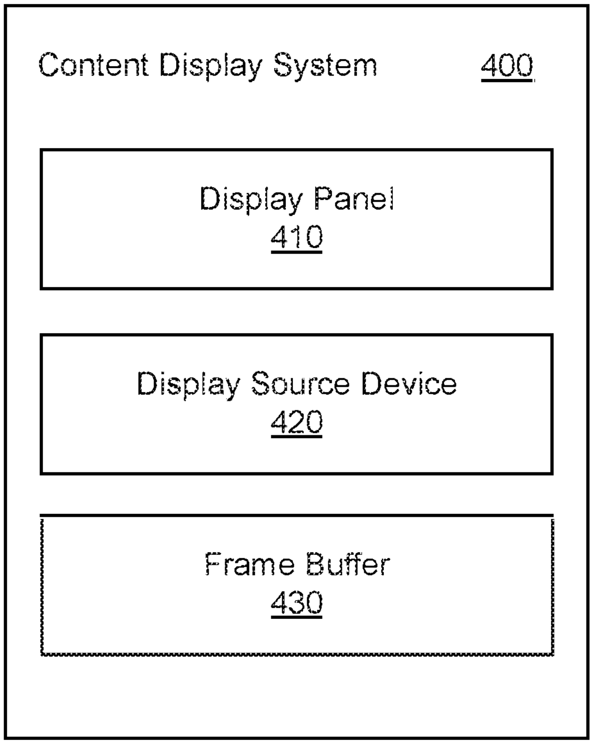
FIG. 4 illustrates a content display system in accordance with an example embodiment.

FIG. 4 illustrates a content display system 400. The content display system 400 can include a display panel 410, a display source device 420 and a frame buffer 430. The display panel 410 can comprise logic to send a frame start indication to the display source device 420. The display source device 420 can comprise logic to align a timing of the display source device 420 to a timing of the display panel 410 based on the frame start indication received from the display panel 410 to obtain frame-level synchronization between the display source device 420 and the display panel 410. The display source device 420 can comprise logic to send, via the frame buffer 430 or by avoiding the frame buffer 430, one or more frame update regions to the display panel 410 in accordance with the timing of the display source device 420 that is aligned to the timing of the display panel 410.

Figure 5:
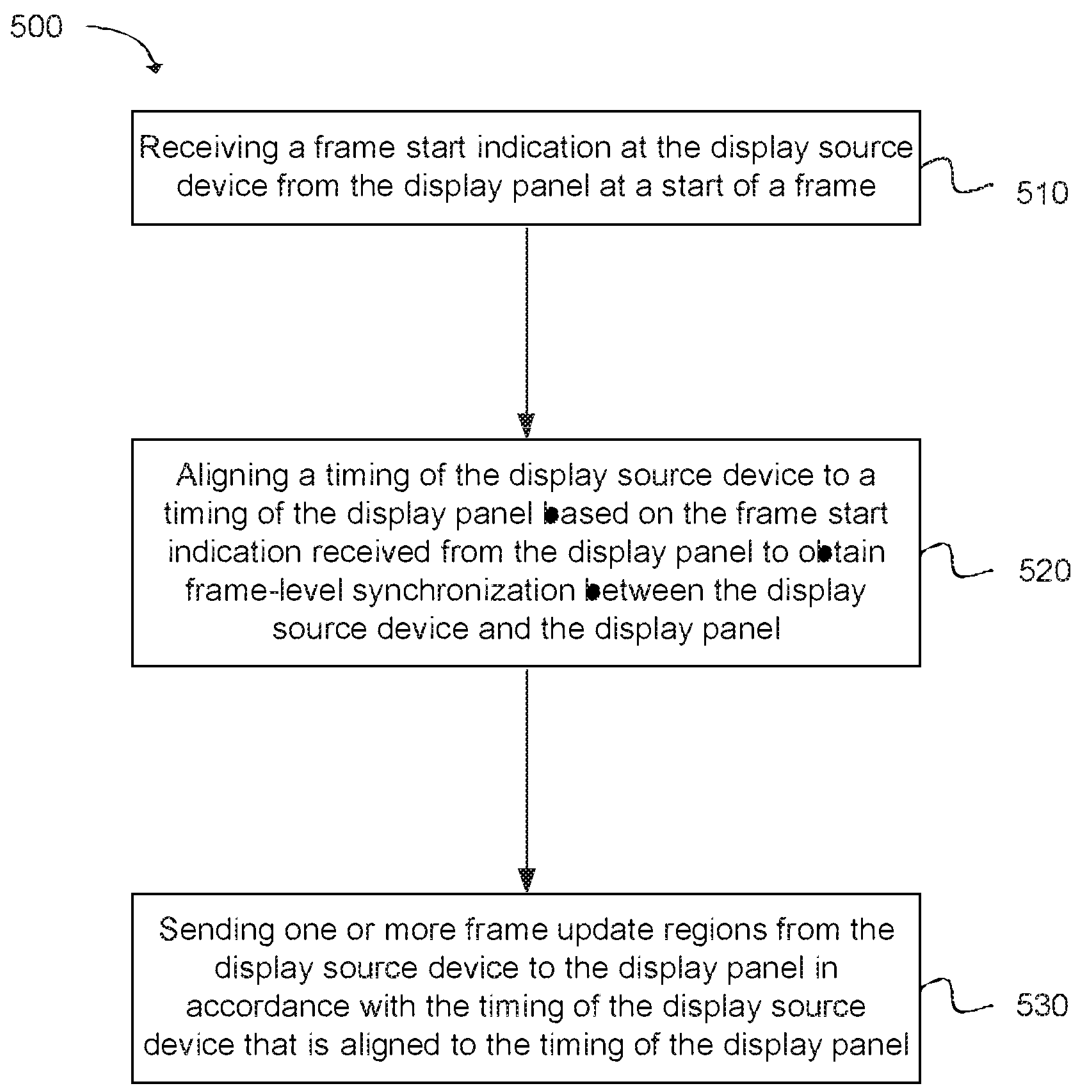
FIG. 5 is a flowchart illustrating operations for sending one or more frame update regions from a display source device to a display panel in accordance with an example embodiment.
Figure 6:
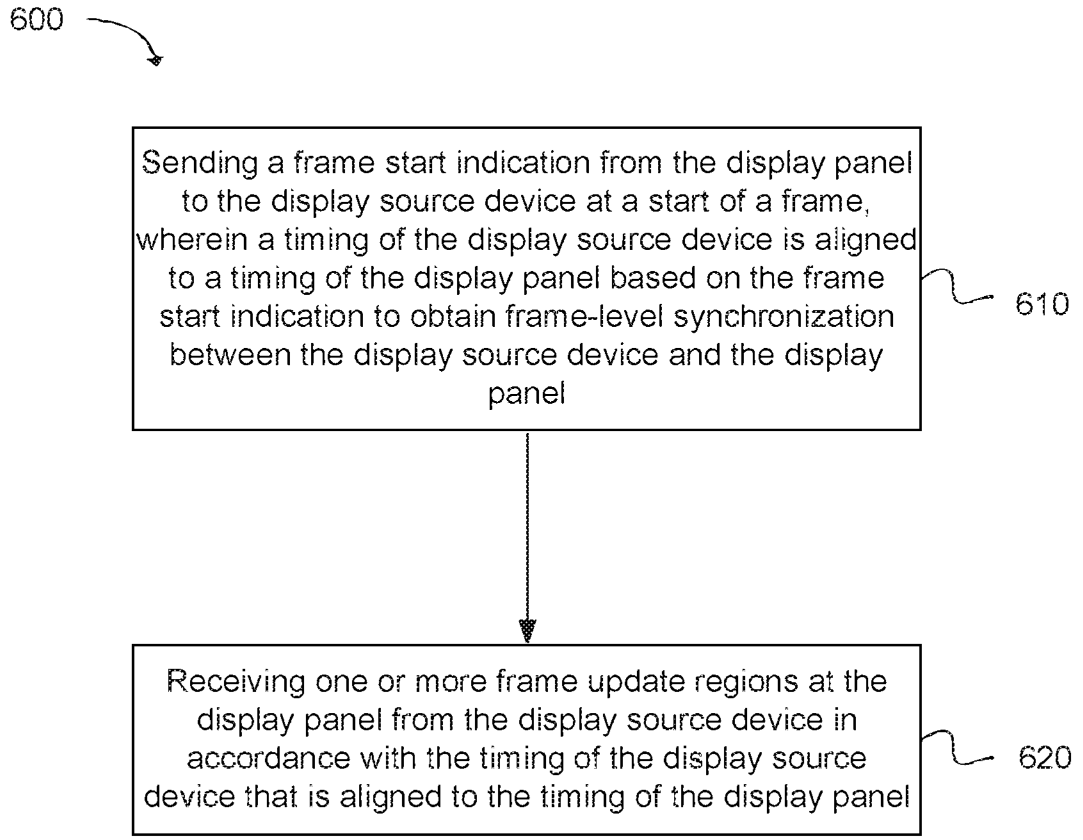
FIG. 6 is a flowchart illustrating operations for receiving one or more frame update regions at a display panel from a display source device in accordance with an example embodiment.

Another example provides a method 500 for sending one or more frame update regions from a display source device to a display panel, as shown in the flow chart in FIG. 5. The method can be executed as instructions on a machine, where the instructions are included on at least one computer readable medium or one non-transitory machine readable storage medium. The method can include the operation of receiving a frame start indication at the display source device from the display panel at a start of a frame, as in block 510. The method can include the operation of aligning a timing of the display source device to a timing of the display panel based on the frame start indication received from the display panel to obtain frame-level synchronization between the display source device and the display panel, as in block 520. The method can include the operation of sending one or more frame update regions from the display source device to the display panel in accordance with the timing of the display source device that is aligned to the timing of the display panel, as in block 530.

Another example provides a method 600 for receiving one or more frame update regions at a display panel from a display source device, as shown in the flow chart in FIG. The method can be executed as instructions on a machine, where the instructions are included on at least one computer readable medium or one non-transitory machine readable storage medium. The method can include the operation of sending a frame start indication from the display panel to the display source device at a start of a frame, wherein a timing of the display source device is aligned to a timing of the display panel based on the frame start indication to obtain frame-level synchronization between the display source device and the display panel, as in block 610. The method can include the operation of receiving one or more frame update regions at the display panel from the display source device in accordance with the timing of the display source device that is aligned to the timing of the display panel, as in block 620.

Figure 7:
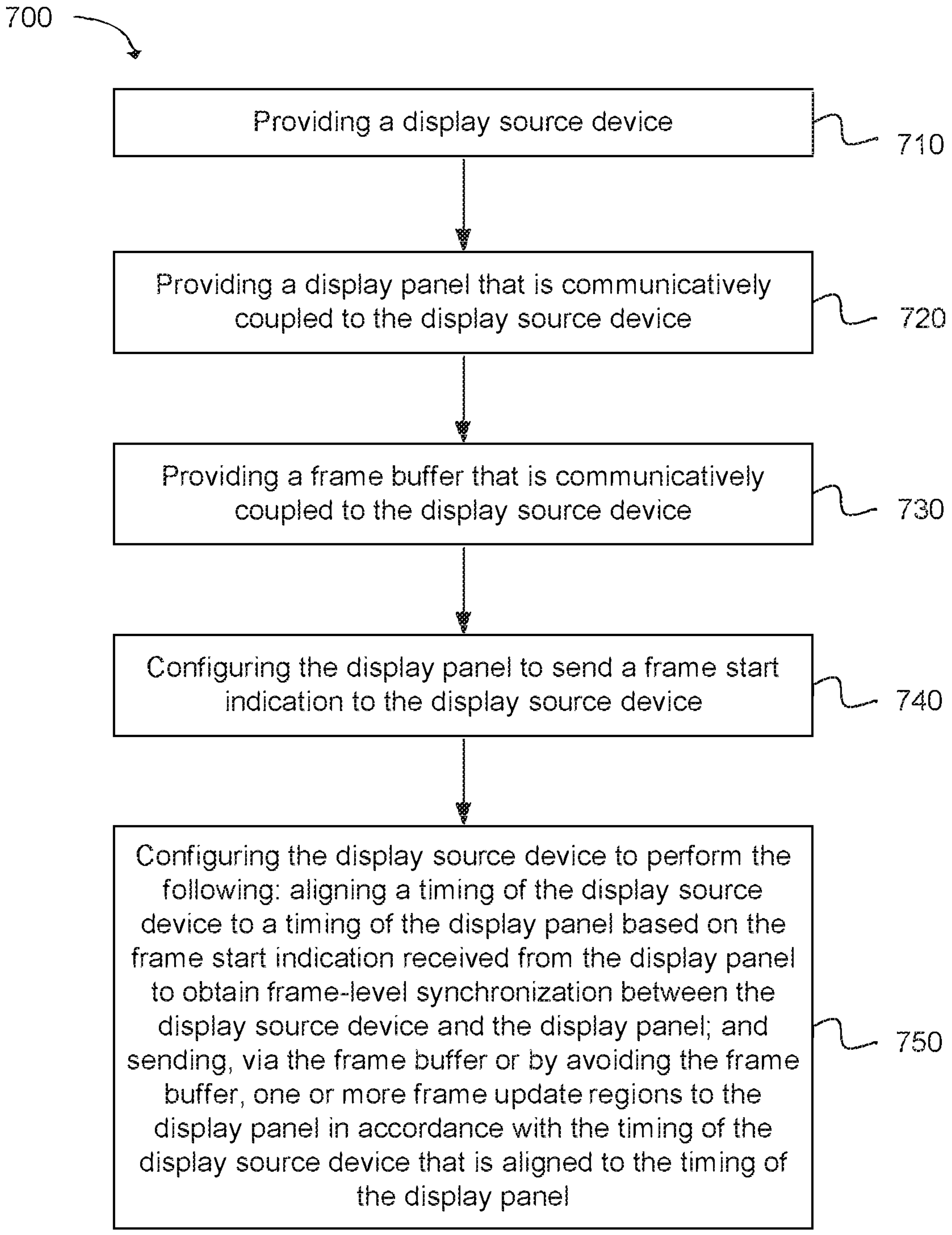
FIG. 7 is a flowchart illustrating operations for making a content display system in accordance with an example embodiment.

Another example provides a method 700 for making a content display system, as shown in the flow chart in FIG. 7. The method can include the operation of providing a display source device, as in block 710. The method can include the operation of providing a display panel that is communicatively coupled to the display source device, as in block 720. The method can include the operation of providing a frame buffer that is communicatively coupled to the display source device, as in block 730. The method can include the operation of configuring the display panel to send a frame start indication to the display source device, as in block 740. The method can include the operation of configuring the display source device to perform the following: aligning a timing of the display source device to a timing of the display panel based on the frame start indication received from the display panel to obtain frame-level synchronization between the display source device and the display panel; and sending, via the frame buffer or by avoiding the frame buffer, one or more frame update regions to the display panel in accordance with the timing of the display source device that is aligned to the timing of the display panel, as in block 750.

Figure 8:
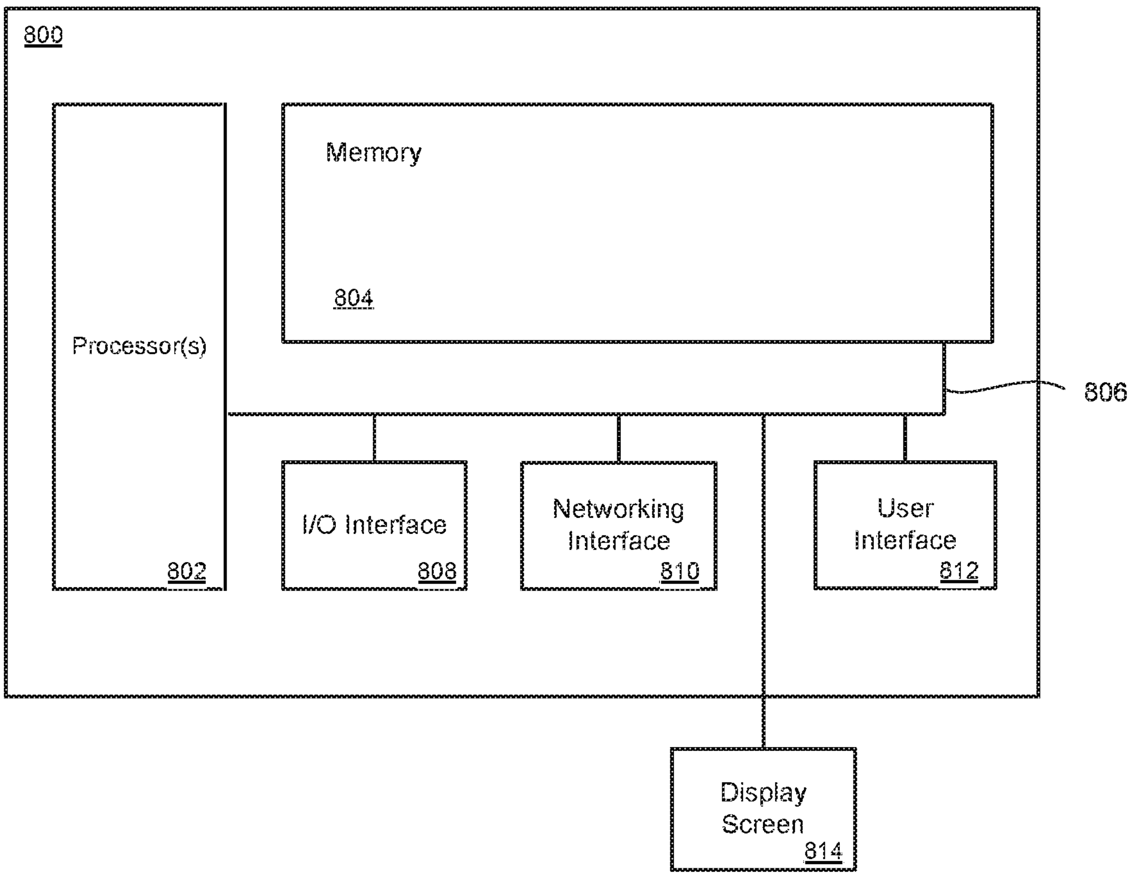
FIG. 8 illustrates a computing system that includes a data storage device in accordance with an example embodiment.

FIG. 8 illustrates a general computing system or device 800 that can be employed in the present technology. The computing system 800 can include a processor 802 in communication with a memory 804. The memory 804 can include any device, combination of devices, circuitry, and the like that is capable of storing, accessing, organizing, and/or retrieving data. Non-limiting examples include SANs (Storage Area Network), cloud storage networks, volatile or non-volatile RANI, phase change memory, optical media, hard-drive type media, and the like, including combinations thereof.

The computing system or device 800 additionally includes a local communication interface 806 for connectivity between the various components of the system. For example, the local communication interface 806 can be a local data bus and/or any related address or control busses as may be desired.

The computing system or device 800 can also include an I/O (input/output) interface 808 for controlling the I/O functions of the system, as well as for I/O connectivity to devices outside of the computing system 800. A network interface 810 can also be included for network connectivity. The network interface 810 can control network communications both within the system and outside of the system. The network interface can include a wired interface, a wireless interface, a Bluetooth interface, optical interface, and the like, including appropriate combinations thereof. Furthermore, the computing system 800 can additionally include a user interface 812, a display device 814, as well as various other components that would be beneficial for such a system.

The processor 802 can be a single or multiple processors, and the memory 804 can be a single or multiple memories. The local communication interface 806 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific technology embodiments and point out specific features, elements, or steps that can be used or otherwise combined in achieving such embodiments.

In one example, there is provided a display source device. The display source device can comprise logic to receive a frame start indication from a display panel at a start of a frame. The display source device can comprise logic to align a timing of the display source device to a timing of the display panel based on the frame start indication received from the display panel to obtain frame-level synchronization between the display source device and the display panel. The display source device can comprise logic to send one or more frame update regions to the display panel in accordance with the timing of the display source device that is aligned to the timing of the display panel.

In one example of the display source device, the display source device can further comprise logic to: send a plurality of partial frame update regions to the display panel as a burst in accordance with the timing of the display source device that is aligned with the timing of the display panel; and enter a low power mode at the display source device after the plurality of partial frame update regions are sent to the display panel.

In one example of the display source device, the display source device can further comprise logic to: send the plurality of partial frame update regions asynchronously after the start of the frame in raster order; and enter the low power mode for a remaining duration of the frame.

In one example of the display source device, each partial frame update region in the plurality of partial frame update regions is associated with a start of the partial frame update region and an end of the partial frame update region.

In one example of the display source device, the plurality of partial frame update regions are sent prior to display of the partial frame update regions at the display panel;

In one example of the display source device, the display source device can further comprise logic to: receive a second frame start indication from the display panel when the display source device is in the low power mode; transition from the low power mode to a normal power mode after the second frame start indication is received from the display panel; realign the timing of the display source device to the timing of the display panel based on the second frame start indication received from the display panel; and send new frame data to the display panel after entering the normal power mode when the display source device includes new frame data to send to the display panel.

In one example of the display source device, the logic is configured to receive the frame start indication from the display panel when the display panel enters a Panel Self Refresh (PSR) mode.

In one example of the display source device, the display source device can further comprise logic to send a full frame update region directly from the display source device to the display panel while avoiding a frame buffer, wherein the full frame update region is sent with an indication that instructs the display panel to bypass reading the full frame update region from the frame buffer.

In one example of the display source device, the display source device can further comprise logic to send a full frame update region directly from the display source device to the display panel while avoiding a frame buffer, wherein the full frame update region is sent with an indication that the full frame update region is to be immediately followed by another full frame update region, and the indication instructs the display panel to bypass reading the full frame update region frame the frame buffer and writing the full frame update region to the frame buffer.

In one example, there is provided a display panel. The display panel can comprise logic to send a frame start indication to a display source device for a start of a frame, wherein a timing of the display source device is aligned to a timing of the display panel based on the frame start indication to obtain frame-level synchronization between the display source device and the display panel. The display panel can comprise logic to receive one or more frame update regions from the display source device in accordance with the timing of the display source device that is aligned to the timing of the display panel.

In one example of the display panel, the display panel can further comprise logic to receive a plurality of partial frame update regions from the display source device as a burst in accordance with the timing of the display source device that is aligned with the timing of the display panel, wherein the plurality of partial frame update regions are received prior to display of the partial frame update regions at the display panel.

In one example of the display panel, the display panel can further comprise logic to receive, from the display source device, the plurality of partial frame update regions asynchronously after the start of the frame in raster order.

In one example of the display panel, each partial frame update region in the plurality of partial frame update regions is associated with a start of the partial frame update region, an end of the partial frame update region and a cyclic redundancy check for the partial frame update region.

In one example of the display panel, the display panel can further comprise logic to: send a second frame start indication to the display source device when the display source device is in a low power mode, wherein the second frame start indication causes the display source device to transition from the low power mode to a normal power mode and realign the timing of the display source device to the timing of the display panel; and receive new frame data from the display source device after the display source device has transitioned to the normal power mode and includes new frame data to send to the display panel.

In one example of the display panel, the logic is configured to send the frame start indication to the display source device when the display panel enters a Panel Self Refresh (PSR) mode.

In one example of the display panel, the display panel can further comprise logic to: receive a full frame update region directly from the display source device that avoids a frame buffer, wherein the full frame update region is received with an indication that instructs the display panel to bypass reading the full frame update region from the frame buffer; write the full frame update region to the frame buffer; and display the full frame update region as received from the display source device.

In one example of the display panel, the display panel can further comprise logic to: receive a full frame update region directly from the display source device that avoids a frame buffer, wherein the full frame update region is received with an indication that the full frame update region is to be immediately followed by another full frame update region; avoid writing the full frame update region to the frame buffer based on the indication received from the display source device; avoid reading the full frame update region from the frame buffer based on the indication received from the display source device; and display the full frame update region as received from the display source device.

In one example, there is provided a content display system. The content display system can comprise a display panel, a display source device, and a frame buffer. The display panel can comprise logic to send a frame start indication to the display source device. The display source device can comprise logic to: align a timing of the display source device to a timing of the display panel based on the frame start indication received from the display panel to obtain frame-level synchronization between the display source device and the display panel; and send, via the frame buffer or by avoiding the frame buffer, one or more frame update regions to the display panel in accordance with the timing of the display source device that is aligned to the timing of the display panel.

In one example of the content display system, the display source device further comprises logic to: send a plurality of partial frame update regions to the display panel as a burst in accordance with the timing of the display source device that is aligned with the timing of the display panel, wherein the plurality of partial frame update regions are sent prior to display of the partial frame update regions at the display panel; and enter a low power mode at the display source device after the plurality of partial frame update regions are sent to the display panel.

In one example of the content display system, the display source device further comprises logic to: send the plurality of partial frame update regions asynchronously after the start of the frame in raster order; and enter the low power mode for a remaining duration of the frame.

In one example of the content display system, the display source device further comprises logic to: receive a second frame start indication from the display panel when the display source device is in the low power mode; transition from the low power mode to a normal power mode after the second frame start indication is received from the display panel; realign the timing of the display source device to the timing of the display panel based on the second frame start indication received from the display panel; and send new frame data to the display panel after entering the normal power mode when the display source device includes new frame data to send to the display panel.

In one example of the content display system, the display source device further comprises logic to send a full frame update region directly from the display source device to the display panel while avoiding the frame buffer, wherein the full frame update region is sent with an indication that instructs the display panel to bypass reading the full frame update region from the frame buffer.

In one example of the content display system, the display panel further comprises logic to: write the full frame update region to the frame buffer; and display the full frame update region as received from the display source device.

In one example of the content display system, the display source device further comprises logic to send a full frame update region directly from the display source device to the display panel while avoiding the frame buffer, wherein the full frame update region is sent with an indication that the full frame update region is to be immediately followed by another full frame update region, and the indication instructs the display panel to bypass reading the full frame update region frame the frame buffer and writing the full frame update region to the frame buffer.

In one example of the content display system, the display panel further comprises logic to: avoid writing the full frame update region to the frame buffer based on the indication received from the display source device; avoid reading the full frame update region from the frame buffer based on the indication received from the display source device; and display the full frame update region as received from the display source device.

In one example, there is provided a method of making a content display system. The method can include providing a display source device. The method can include providing a display panel that is communicatively coupled to the display source device. The method can include providing a frame buffer that is communicatively coupled to the display source device. The method can include configuring the display panel to send a frame start indication to the display source device. The method can include configuring the display source device to perform the following: aligning a timing of the display source device to a timing of the display panel based on the frame start indication received from the display panel to obtain frame-level synchronization between the display source device and the display panel; and sending, via the frame buffer or by avoiding the frame buffer, one or more frame update regions to the display panel in accordance with the timing of the display source device that is aligned to the timing of the display panel.

In one example of the method of making the content display system, the method can further include configuring the display source device to perform the following: sending a plurality of partial frame update regions to the display panel as a burst in accordance with the timing of the display source device that is aligned with the timing of the display panel, wherein the plurality of partial frame update regions are sent prior to display of the partial frame update regions at the display panel; and entering a low power mode at the display source device after the plurality of partial frame update regions are sent to the display panel.

In one example of the method of making the content display system, the method can further include configuring the display source device to perform the following: sending the plurality of partial frame update regions asynchronously after the start of the frame in raster order; and entering the low power mode for a remaining duration of the frame.

In one example of the method of making the content display system, the method can further include configuring the display source device to perform the following: receiving a second frame start indication from the display panel when the display source device is in the low power mode; transitioning from the low power mode to a normal power mode after the second frame start indication is received from the display panel; realigning the timing of the display source device to the timing of the display panel based on the second frame start indication received from the display panel; and sending new frame data to the display panel after entering the normal power mode when the display source device includes new frame data to send to the display panel.

In one example of the method of making the content display system, the method can further include configuring the display source device to perform the following: sending a full frame update region directly from the display source device to the display panel while avoiding the frame buffer, wherein the full frame update region is sent with an indication that instructs the display panel to bypass reading the full frame update region from the frame buffer.

In one example of the method of making the content display system, the method can further include configuring the display panel to perform the following: writing the full frame update region to the frame buffer; and displaying the full frame update region as received from the display source device.

In one example of the method of making the content display system, the method can further include configuring the display source device to perform the following: sending a full frame update region directly from the display source device to the display panel while avoiding the frame buffer, wherein the full frame update region is sent with an indication that the full frame update region is to be immediately followed by another full frame update region, and the indication instructs the display panel to bypass reading the full frame update region frame the frame buffer and writing the full frame update region to the frame buffer.

In one example of the method of making the content display system, the method can further include configuring the display source device to perform the following: avoiding writing the full frame update region to the frame buffer based on the indication received from the display source device; avoiding reading the full frame update region from the frame buffer based on the indication received from the display source device; and displaying the full frame update region as received from the display source device.

In one example, there is provided at least one non-transitory machine readable storage medium having instructions embodied thereon for sending one or more frame update regions from a display source device to a display panel. The instructions when executed by a controller in the display source device perform the following: receiving a frame start indication at the display source device from the display panel at a start of a frame; aligning a timing of the display source device to a timing of the display panel based on the frame start indication received from the display panel to obtain frame-level synchronization between the display source device and the display panel; and sending one or more frame update regions from the display source device to the display panel in accordance with the timing of the display source device that is aligned to the timing of the display panel.

In one example of the at least one non-transitory machine readable storage medium, the at least one non-transitory machine readable storage medium further comprises instructions when executed perform the following: sending a plurality of partial frame update regions to the display panel as a burst in accordance with the timing of the display source device that is aligned with the timing of the display panel, wherein the plurality of partial frame update regions are sent prior to display of the partial frame update regions at the display panel; and entering a low power mode at the display source device after the plurality of partial frame update regions are sent to the display panel.

In one example of the at least one non-transitory machine readable storage medium, the at least one non-transitory machine readable storage medium further comprises instructions when executed perform the following: sending the plurality of partial frame update regions asynchronously after the start of the frame in raster order; and entering the low power mode for a remaining duration of the frame.

In one example of the at least one non-transitory machine readable storage medium, the at least one non-transitory machine readable storage medium further comprises instructions when executed perform the following: receiving a second frame start indication from the display panel when the display source device is in the low power mode; transitioning from the low power mode to a normal power mode after the second frame start indication is received from the display panel; realigning the timing of the display source device to the timing of the display panel based on the second frame start indication received from the display panel; and sending new frame data to the display panel after entering the normal power mode when the display source device includes new frame data to send to the display panel.

In one example of the at least one non-transitory machine readable storage medium, the at least one non-transitory machine readable storage medium further comprises instructions when executed perform the following: receiving the frame start indication from the display panel when the display panel enters a Panel Self Refresh (PSR) mode.

In one example of the at least one non-transitory machine readable storage medium, the at least one non-transitory machine readable storage medium further comprises instructions when executed perform the following: sending a full frame update region directly from the display source device to the display panel while avoiding a frame buffer, wherein the full frame update region is sent with an indication that instructs the display panel to bypass reading the full frame update region from the frame buffer.

In one example of the at least one non-transitory machine readable storage medium, the at least one non-transitory machine readable storage medium further comprises instructions when executed perform the following: sending a full frame update region directly from the display source device to the display panel while avoiding a frame buffer, wherein the full frame update region is sent with an indication that the full frame update region is to be immediately followed by another full frame update region, and the indication instructs the display panel to bypass reading the full frame update region frame the frame buffer and writing the full frame update region to the frame buffer.

In one example, there is provided at least one non-transitory machine readable storage medium having instructions embodied thereon for receiving one or more frame update regions at a display panel from a display source device, the instructions when executed by a controller in the display panel perform the following: sending a frame start indication from the display panel to the display source device at a start of a frame, wherein a timing of the display source device is aligned to a timing of the display panel based on the frame start indication to obtain frame-level synchronization between the display source device and the display panel; and receiving one or more frame update regions at the display panel from the display source device in accordance with the timing of the display source device that is aligned to the timing of the display panel.

In one example of the at least one non-transitory machine readable storage medium, the at least one non-transitory machine readable storage medium further comprises instructions when executed perform the following: receiving a plurality of partial frame update regions from the display source device as a burst in accordance with the timing of the display source device that is aligned with the timing of the display panel, wherein the plurality of partial frame update regions are received prior to display of the partial frame update regions at the display panel.

In one example of the at least one non-transitory machine readable storage medium, the at least one non-transitory machine readable storage medium further comprises instructions when executed perform the following: receiving, from the display source device, the plurality of partial frame update regions asynchronously after the start of the frame in raster order.

In one example of the at least one non-transitory machine readable storage medium, the at least one non-transitory machine readable storage medium further comprises instructions when executed perform the following: sending a second frame start indication to the display source device when the display source device is in a low power mode, wherein the second frame start indication causes the display source device to transition from the low power mode to a normal power mode and realign the timing of the display source device to the timing of the display panel; and receiving new frame data from the display source device after the display source device has transitioned to the normal power mode and includes new frame data to send to the display panel.

In one example of the at least one non-transitory machine readable storage medium, the at least one non-transitory machine readable storage medium further comprises instructions when executed perform the following: receiving a full frame update region directly from the display source device that avoids a frame buffer, wherein the full frame update region is received with an indication that instructs the display panel to bypass reading the full frame update region from the frame buffer; writing the full frame update region to the frame buffer; and displaying the full frame update region as received from the display source device.

In one example of the at least one non-transitory machine readable storage medium, the at least one non-transitory machine readable storage medium further comprises instructions when executed perform the following: receiving a full frame update region directly from the display source device that avoids a frame buffer, wherein the full frame update region is received with an indication that the full frame update region is to be immediately followed by another full frame update region; avoiding writing the full frame update region to the frame buffer based on the indication received from the display source device; avoiding reading the full frame update region from the frame buffer based on the indication received from the display source device; and displaying the full frame update region as received from the display source device.

While the forgoing examples are illustrative of the principles of technology embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. An apparatus comprising:

a display source device; and a display sink communicatively coupled to the display source device, the display source device to:

transmit, when the display source device and the display sink are in a refresh mode, a partial frame update to the display sink at least partially on line 1 of a frame transmission, wherein the frame transmission consists of N lines enumerated line 1, line 2 . . . line N, wherein the partial frame update corresponds to a region a plurality of lines below line 1 of a frame corresponding to the frame transmission, wherein the frame consists of N lines enumerated line 1, line 2, . . . line N, the display sink to:

receive, when the display source device and the display sink are in the refresh mode, the partial frame update from the display source device at least partially on line 1 of the frame transmission; and display the partial frame update in the region the plurality of lines below line 1 of the frame corresponding to the frame transmission.

2. The apparatus of claim 1, wherein the display source device is to transmit, during a vertical blanking interval before the frame transmission, an indication that the partial frame update will be sent.

3. The apparatus of claim 1, wherein to transmit the partial frame update to the display sink comprises to transmit the partial frame update to the display sink at a stream clock rate after synchronization between the display source device and the display sink.

4. The apparatus of claim 1, wherein the display source device is to transmit, before transmission of the partial frame update, an indication that the next frame update after the partial frame update will be a full frame update.

5. The apparatus of claim 4, wherein the display sink is to:

receive the indication that the next frame update after the partial frame update will be a full frame update; and display the partial frame update without buffering the partial frame update in response to receipt of the indication that the next frame update after the partial frame update will be a full frame update.

6. The apparatus of claim 1, wherein the display source device is to enter a low power mode after transmission of the partial frame update and before display of the partial frame update.

7. The apparatus of claim 1, wherein the display source device and the display sink are to synchronize based on transmission of a frame start indicator for the frame, wherein the frame start indicator is transmitted before transmission of the partial frame update.

8. The apparatus of claim 1, wherein the apparatus is a laptop.

9. The apparatus of claim 1, wherein the apparatus is a smart phone.

10. An apparatus comprising:

means for transmitting a partial frame update from a display source device to a display sink at least partially on line 1 of a frame transmission while the display source device and the display sink are in a refresh mode, wherein the frame transmission consists of N lines enumerated line 1, line 2, . . . line N, wherein the partial frame update corresponds to a region a plurality of lines below a first line of a frame corresponding to the frame transmission, wherein the frame consists of N lines enumerated line 1, line 2, . . . line N, means for receiving the partial frame update from the display source device at least partially on line 1 of the frame transmission while the display source device and the display sink are in the refresh mode; and means for displaying the partial frame update in the region the plurality of lines below line 1 of the frame corresponding to the frame transmission.

11. The apparatus of claim 10, further comprising means for transmitting, during a vertical blanking interval before the frame transmission, an indication that the partial frame update will be sent.

12. The apparatus of claim 10, further comprising means for transmitting, before transmission of the partial frame update, an indication that the next frame update after the partial frame update will be a full frame update.

13. The apparatus of claim 12, further comprising means for receiving the indication that the next frame update after the partial frame update will be a full frame update; and means for displaying the partial frame update without buffering the partial frame update in response to receipt of the indication that the next frame update after the partial frame update will be a full frame update.

14. The apparatus of claim 10, further comprising means for entering a low power mode after transmission of the partial frame update and before display of the partial frame update.

15. One or more non-transitory computer-readable media comprising a plurality of instructions stored thereon that, when executed, causes a compute device to:

transmit a partial frame update from a display source device of the compute device to a display sink of the compute device at least partially on line 1 of a frame transmission while the display source device and the display sink are in a refresh mode, wherein the frame transmission consists of N lines enumerated line 1, line 2, . . . line N, wherein the partial frame update corresponds to a region a plurality of lines below line 1 of a frame corresponding to the frame transmission, wherein the frame consists of N lines enumerated line 1, line 2, . . . line N, receive, by the display sink and when the display source device and the display sink are in the refresh mode, the partial frame update from the display source device at least partially on line 1 of the frame transmission; and display, by the display sink, the partial frame update in the region the plurality of lines below line 1 of the frame corresponding to the frame transmission.

16. The one or more non-transitory computer-readable media of claim 15, wherein the plurality of instructions further cause the display source device to transmit, during a vertical blanking interval before the frame transmission, an indication that the partial frame update will be sent.

17. The one or more non-transitory computer-readable media of claim 15, wherein to transmit the partial frame update to the display sink comprises to transmit the partial frame update to the display sink at a stream clock rate after synchronization between the display source device and the display sink.

18. The one or more non-transitory computer-readable media of claim 15, wherein the plurality of instructions further cause the display source device to transmit, before transmission of the partial frame update, an indication that the next frame update after the partial frame update will be a full frame update.

19. The one or more non-transitory computer-readable media of claim 18, wherein the plurality of instructions further cause the display sink to:

receive the indication that the next frame update after the partial frame update will be a full frame update; and display the partial frame update without buffering the partial frame update in response to receipt of the indication that the next frame update after the partial frame update will be a full frame update.

20. The one or more non-transitory computer-readable media of claim 15, wherein the plurality of instructions further cause the display source device to enter a low power mode after transmission of the partial frame update and before display of the partial frame update.

* * * * *